United States Patent [19]

Jaudt

[11] 4,138,126
[45] Feb. 6, 1979

[54] ADJUSTABLE PACKING ASSEMBLY

[76] Inventor: Andreas Jaudt, Schongauerstrasse 10C, D-8900 Augsburg, Fed. Rep. of Germany

[21] Appl. No.: 883,975

[22] Filed: Mar. 6, 1978

[30] Foreign Application Priority Data

Oct. 19, 1977 [DE] Fed. Rep. of Germany ....... 2746956

[51] Int. Cl.² .................. F16K 27/04; F16K 3/02; F16J 15/16
[52] U.S. Cl. .................. 277/191; 277/12; 277/120; 251/214; 251/328; 251/159; 251/197
[58] Field of Search ........... 277/117, 12, 143–144, 277/190, 191, 120; 251/214, 326, 328, 329, 159, 171, 187, 197

[56] References Cited
U.S. PATENT DOCUMENTS

| | | | |
|---|---|---|---|
| 463,053 | 11/1891 | Houston | 277/120 X |
| 609,752 | 8/1898 | Angell | 277/120 |
| 2,732,170 | 1/1956 | Shand | 251/328 X |
| 2,946,349 | 7/1960 | Hamer | 251/159 X |
| 3,097,823 | 7/1963 | Kaiser | 251/214 X |
| 3,125,323 | 3/1964 | Heinen | 251/197 |
| 3,917,223 | 11/1975 | Sidler et al. | 251/214 |
| 4,026,517 | 5/1977 | Still | 251/214 |

FOREIGN PATENT DOCUMENTS

| | | | |
|---|---|---|---|
| 664585 | 6/1963 | Canada | 251/197 |
| 1008070 | 5/1957 | Fed. Rep. of Germany | 277/120 |

*Primary Examiner*—Robert S. Ward, Jr.
*Attorney, Agent, or Firm*—Pollock, Vande Sande & Priddy

[57] ABSTRACT

The present invention relates to a new and useful adjustable packing assembly for a flat, slide-valve control member which comprises: a rectangular housing which supports a plurality of packing members in abutting contact with the flat control member; a plurality of stationary wedge members having a flat surface for abutment with the packing members and further having a surface including a plurality of interconnected, tapered steps; and at least one movable wedge member which includes a surface of a shape similar to and abutting the stepped surface of the stationary wedges, whereby movement of the movable wedges forces the stationary wedges to compress the packing members against the control member.

12 Claims, 2 Drawing Figures

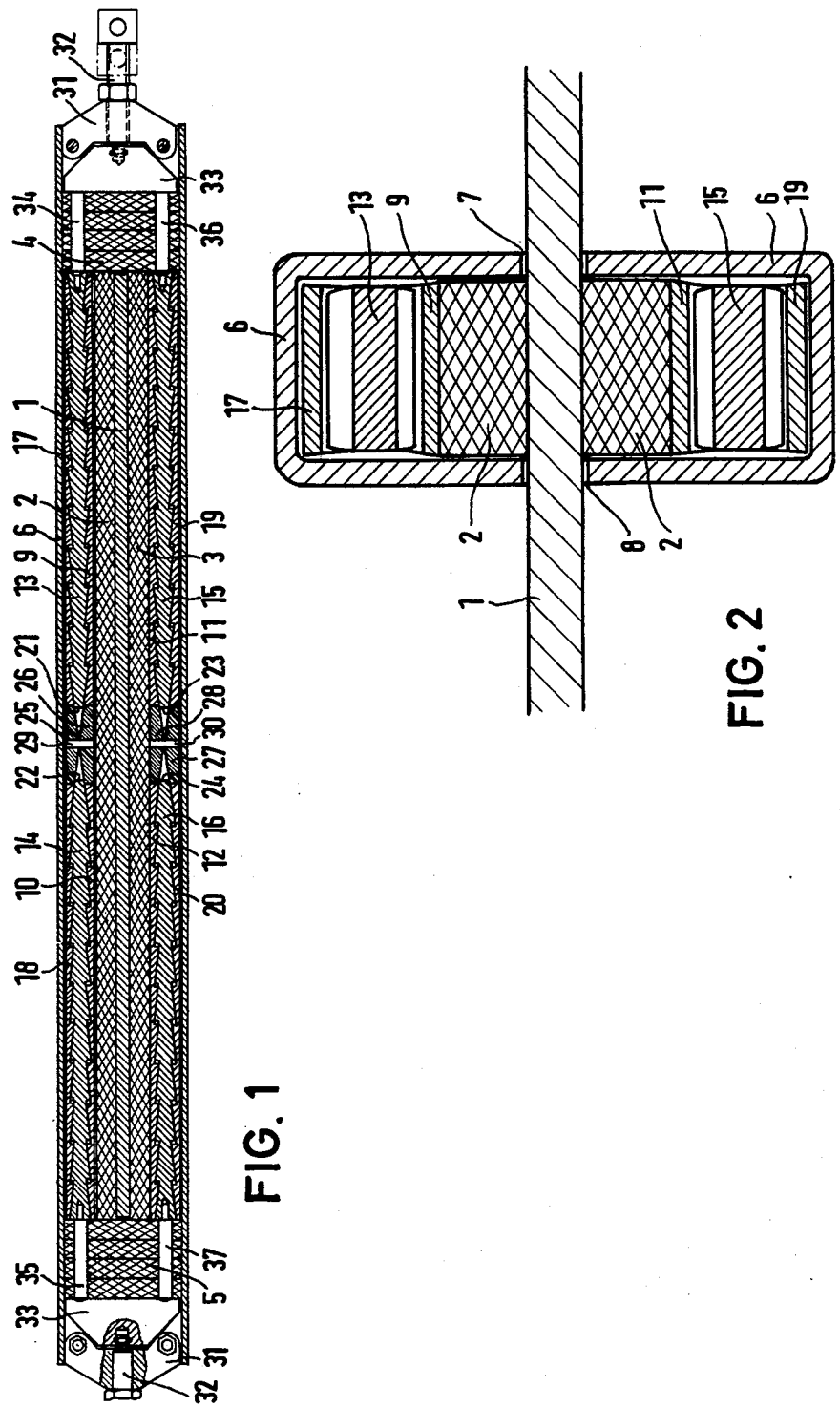

ADJUSTABLE PACKING ASSEMBLY

BACKGROUND OF THE INVENTION

The present invention relates to a new and useful adjustable packing assembly which makes sliding abutment with the outer surfaces of a flat, slide-valve control member.

Known adjustable packing assemblies generally employ a lathe or similar device to adjustably press the packing members against the control member. Because of this, problems often arise with a relatively long, adjustable packing assembly.

As for example, because the portion of the packing members nearest the lathe receives the greatest pressure, the members are often pressed against the control member with a contact pressure high enough to render the slide immovable. Furthermore, because the external pressure is reduced as the distance from the lathe is increased, the resulting contact pressure between those portions of the packing members and slide furthest from the lathe is reduced the greatest amount, leading to the formation of stress cracks in the packing members as well as the loss of a fluid-tight seal.

As will be described in greater detail hereafter, applicant's invention overcomes the aforestated problems by forming an adjustable, fluid-tight packing assembly which provides even contact pressure between the surfaces of the packing members and the flat surfaces of the slide control member.

OBJECTS AND SUMMARY OF THE INVENTION

An object of the present invention is to provide an improved adjustable packing assembly capable of pressing packing members against a flat, slide-valve control member with a force which is adjustable.

A further object of the present invention is to provide an improved packing assembly which creates an even contact pressure between the packing surfaces and the abutting, flat surfaces of the control member.

Yet, a further object of the present invention is to provide an improved packing device which is simple to assemble and inexpensive to manufacture.

The above and further objects are achieved by the adjustable packing assembly of the present invention, wherein a first pair of packing members contacts the flat, end surfaces of a slide control member while a second pair of packing members contacts the flat, side surfaces of the control member. A rectangular housing surrounds the packing assembly with at least one adjusting element positionable therein to uniformly vary the contact pressure between the first and second pairs of packing members and the abutting surfaces of the control member providing an effective fluid-tight packing assembly.

These and other features of this invention, along with its incident advantages, will be better understood and appreciated from the following detailed description of a preferred embodiment thereof, selected for purposes of illustration only and shown in the accompanying drawings, in which:

BRIEF DESCRIPTION OF THE DRAWINGS

FIG. 1 shows a longitudinal cross-section of the adjustable packing assembly of a preferred embodiment; and FIG. 2 shows the preferred embodiment of FIG. 1 in axial cross-section.

DESCRIPTION OF A PREFERRED EMBODIMENT

When referring to the drawings, like numerals are used to designate like elements throughout.

Referring to FIG. 1 in particular, a flat, slide-valve control member 1 extends between a pair of elongated packing members 2 and 3, respectively. Control member 1 includes a pair of flat, side surfaces which abut a corresponding pair of flat, side surfaces formed on packing members 2 and 3. A further pair of spaced packing members 4 and 5, each abuts one of two end surfaces formed on control member 1. The gland packing assembly comprised of packing members 2–5 is supported within a rectangularly shaped housing 6 formed with a pair of through slots 7 and 8, of a width sufficient to accommodate control member 1 in sliding contact.

A pair of stationary, wedging members 9 and 10 each includes a flat, side surface which abuts a corresponding, flat surface portion of packing member 2. In a similar manner, a pair of stationary, wedging members 11 and 12 each includes a flat, side surface which abuts a corresponding, flat surface portion of packing member 3. Wedging members 9 and 11 each further includes side surfaces formed with a plurality of interconnected steps, with each step tapered in the direction of packing member 4. In a like manner, wedging members 10 and 12 each further includes a side surface formed with a plurality of interconnected steps, with each step tapered in the direction of packing member 5.

A plurality of movable wedging members 13–16 are each formed with a side surface including a plurality of interconnected and tapered steps, identical in shape to the steps formed in stationary wedging members 9–12, respectively. Furthermore, movable wedging members 13–16 are arranged such that the stepped surface of wedge 13 abuts the identically shaped surface of wedge 9, with movable wedging member 14 abutting stationary wedging member 10, movable wedging member 15 abutting stationary wedging member 11 and movable wedging member 16 abutting stationary wedging member 16, respectively.

Movement of wedging members 13–16 towards one another generates an increasing contact pressure between the stepped surfaces formed on wedging members 13–16 and the stepped surfaces formed on wedging members 9–12, respectively. This increasing contact pressure includes a component which forces packing members 2 and 3 against control member 1 with a correspondingly increasing force. A uniform force is generated along the contact surfaces between packing members 2 and 3 and control member 1, because of the component contact pressure generated between each pair of abutting steps over the surfaces of wedging members 9–12 and 13–16, respectively.

A further pair of stationary, wedging members 17–20 each includes a flat side surface which abuts an inner surface of housing 6, and each wedging member 17 through 20 further includes a side surface formed with a plurality of interconnected steps facing control member 1 and tapered in the same direction as the steps formed in wedging members 9 through 12, respectively.

Movable wedging members 13 through 16 are further formed with interconnected step-shaped surfaces similar in shape to the step surfaces formed on wedging members 17 through 20, respectively.

The movement of wedging members 13 through 16 toward one another generates a component of contact pressure between tapered steps 13–16 and 17–20, respectively, in the direction of control member 1 which further increases the force with which packing members 2 and 3 are pressed against the surface of control member 1.

Each of the movable wedging members 13–16 includes a tapered end portion 21–24, respectively. A pair of V-shaped wedge supports 25 and 26 are positioned back-to-back within housing 6, wherein each wedge support 25 and 26 includes a first, flat surface portion engaging an inner wall of housing 6 and a second, flat surface portion engaging a flat, side surface of packing member 2. Wedge supports 25 and 26 are linked together by means of a pin 29. In a similar manner, V-shaped wedge supports 27 and 28 are positioned back-to-back, with a first surface of each of the supports 27 and 28 engaging an inner wall of housing 6, while a second, flat surface of each of the supports engages a flat, side surface of packing member 3. Wedge supports 27 and 28 are linked together by means of a pin 36. Movable wedging members 13–16 are positioned within housing 6, such that each of the integral, tapered end portions 21–24 slidingly engages a respective wedge support 25–28.

As wedging members 13–16 are moved towards one another, the integral tapered end portions 21–24 slidingly abut wedge supports 25–28, generating an increasing contact pressure. A component of the contact pressure presses wedge supports 25–28 against packing members 2 and 3, respectively, assisting wedging members 9–12 in providing a uniform bearing pressure between packing members 2, 3 and control member 1.

Apparatus for moving wedging members 13–16 includes adjusting elements positioned on both sides of housing 6, with one of the adjusting elements acting upon wedges 13 and 15 and the remaining adjusting element acting on wedges 14 and 16.

Each adjusting element includes a support 31, which is connected to housing 6 and which is fixedly attached to an adjusting screw 32. A pressure pad 33 is positioned between support 31 and either packing 4 or 5, respectively.

Pins 34 and 36 are attached to a first pressure pad 33 and extend laterally through packing member 4, into contact with the movable wedging members 13 and 15, respectively. Further pins 35 and 37 are attached to a second pressure pad 33 and extend laterally through packing member 5, into contact with movable wedging members 14 and 16, respectively.

When adjusting screws 32 are threaded towards one another, pressure pads 33 are correspondingly forced to move towards one another. As pressure pads 33 move towards one another, lateral packings 4 and 5 are forced against the lateral edges of control member 1 with increasing pressure, while at the same time, pins 34–37 force wedges 13–16 towards one another. As explained above, the movement of wedges 13–16 towards one another increases the bearing pressure which packing members 2 and 3 exert against the sides of control member 1.

While the illustrated embodiments of the invention have been described hereinbefore with particularity, it will be understood that various other modifications will be apparent to and can readily be made by those skilled in the art without departing from the scope and spirit of the invention. As for example, in further preferred embodiments, the present invention could be shaped to provide packing about a non-flat control member. Accordingly, it is not intended that the scope of the claims appended hereto be limited to the description set forth herein, but rather that the claims be construed as encompassing all the features and patentable novelty which reside in the present invention including all features which will be treated as equivalent thereof by those skilled in the art to which the invention pertains.

What I claim is:

1. An adjustable packing assembly for creating a fluid-tight sliding connection with a slide-valve control member, said assembly comprising:
    a hollow housing including a pair of through slots formed in opposite side walls of said housing, with said through slots of a sufficient size to allow said control member to pass therethrough;
    a plurality of packing members positioned within said housing and surrounding said control member, with at least one packing member in adjustably, abutting contact with each surface of said control member;
    stationary wedging means positioned within said housing for providing adjustable pressure against those packing members contacting the side surfaces of said control member;
    movable wedging means positioned within said housing and in sliding contact with said stationary wedging means; and
    means responsive to selective movement of said movable wedging means for adjusting the bearing pressure between said packing members and said control member, with said responsive means applying a uniform bearing pressure against the entire surface of said packing members.

2. A packing assembly according to claim 1, wherein said housing includes a cross-section of generally, rectangular shape, with said through slots extending transversely along opposite side walls dividing said housing into two portions of approximately equal size.

3. A packing assembly according to claim 1, wherein two pairs of V-shaped wedge supports are positioned back to back within said housing,
    each of said supports includes an outer surface abutting an inner surface of said housing, and each of said supports further includes a further outer surface abutting one of said packing members which contacts a side surface of said control member.

4. A packing assembly according to claim 3, wherein a separate pin member is positioned within a slot formed through each of said pair of V-shaped supports, allowing said supports to move radially within said housing to assist in adjusting the bearing pressure between said packing members and said control member.

5. A packing assembly according to claim 4, wherein said movable wedging means includes tapered ends which slidably engage the V-shaped portion of said wedge supports.

6. A packing assembly according to claim 1, wherein said stationary wedging means comprises a plurality of individual wedge members, wherein
    a first plurality of said wedge members each includes a flat, side surface positioned in abutting contact with packing members that abut the side surface of said control member, a second plurality of said wedge members each includes a flat, side surface positioned in abutting contact with an inner surface of said housing, said first and second wedge members are positioned opposite one another, respectively, with the facing surfaces being formed with a slidably engaging wedging surface.

7. A packing assembly according to claim 6, wherein said movable wedging means comprises a plurality of movable wedge members, each of said movable wedges includes opposite, side surfaces formed with a slidably engaging wedge surface, and with each movable wedge member slidably extending between and engaging a respective first and second stationary wedge member.

8. A packing assembly according to claim 7, wherein a pair of said movable wedge members are positioned on either side of said control member, with each of said pair of movable members being selectively movable to uniformly adjust the bearing pressure between said packing members and said control member.

9. A packing member according to claim 7, wherein said responsive means comprises forming said slidably engaging wedge surfaces with a plurality of identical and interconnected steps, with the plurality of steps of said engaging wedge surfaces being tapered in the same direction, with said tapered step surfaces selectively positioned to engage one another for generating a bearing pressure forcing each of said packing members into uniform, fluid-tight contact with said control member.

10. A packing assembly according to claim 1, wherein pressure pads are positioned adjacent those packing members that abut the lateral, edge surfaces of said control member, and adjusting assemblies are attached to said housing and are positioned adjacent to said pressure pads.

11. A packing assembly according to claim 10, wherein each adjusting assembly supports a threaded screw which extends into a threaded bore formed in an adjacent pressure pad, with each of said threaded screws being selectively rotatable to move said pressure pads towards or away from one another.

12. A packing assembly according to claim 11, wherein a plurality of attachment pins extend from said pressure pads, through laterally extending packing members and into attachment with said movable wedging means, whereby selective rotation of said screw members acts to reciprocate said interconnected pressure pads, attachment pins and movable wedging means either towards or away from one another, uniformly adjusting the bearing pressure between the packing members and control member.

* * * * *